United States Patent [19]

Sumiya et al.

[11] Patent Number: 5,319,672

[45] Date of Patent: Jun. 7, 1994

[54] SPREAD SPECTRUM COMMUNICATION SYSTEM

[75] Inventors: Munehiko Sumiya; Hideyuki Shinonaga, both of Saitama, Japan

[73] Assignee: Kokusai Denshin Denwa Co., Ltd., Tokyo, Japan

[21] Appl. No.: 24,367

[22] Filed: Mar. 1, 1993

[30] Foreign Application Priority Data

Mar. 18, 1992 [JP] Japan .................................. 4-091574

[51] Int. Cl.$^5$ ............................................. H04L 9/00
[52] U.S. Cl. ............................................. 375/1; 380/46
[58] Field of Search ............................... 375/1; 380/46

[56] References Cited

PUBLICATIONS

"Overview of Cellular CDMA", LEE, IEEE Transactions on Vehicular Technology, vol. 40, No. 2, May 1991, pp. 291-302.
"On the Capacity of a Cellular CDMA System", Gilhousen et al., IEEE Transactions on Vehicular Technology, vol. 40, No. 2, May 1991, pp. 303-312.
"Spread Spectrum for Mobile Communications", Pickholtz et al., IEEE Transactions on Vehicular Technology, vol. 40, No. 2, May 1991, pp. 313-322.

Primary Examiner—David C. Cain
Attorney, Agent, or Firm—Nikaido, Marmelstein, Murray & Oram

[57] ABSTRACT

A spread spectrum communication system has a plurality of transmit ends capable of simultaneous communications and at least one receive end. Each of the transmit ends modulates digital information by a PN code to provide a spread signal, modulates a carrier by the spread signal to provide modulated signal, and then transmits the modulated signal to the receive end. These transmit ends use the same PN code for spreading the respective digital information and use carriers having different frequencies from each other so that spectrums of at least two of the modulated signals overlap each other. The receive end receives signals transmitted from the transmit ends to provide a received signal, frequency-converts the received signal to provide a converted signal, and calculates a correlation between the converted signal and the PN code to recover the digital information transmitted from the desired transmit end. This receive end extracts a signal having a center frequency which corresponds to the carrier frequency of the desired transmit end to provide the converted signal.

24 Claims, 12 Drawing Sheets

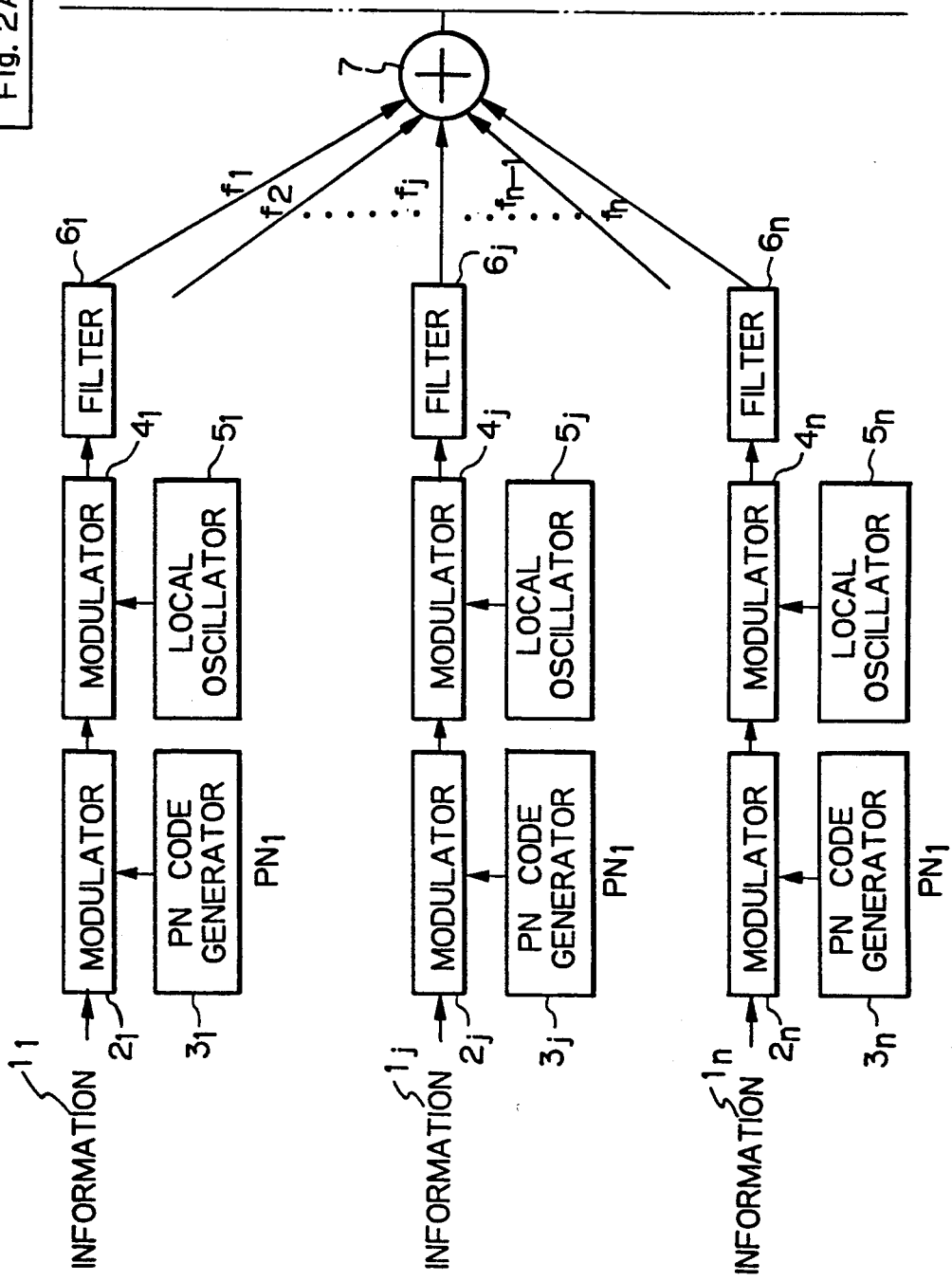

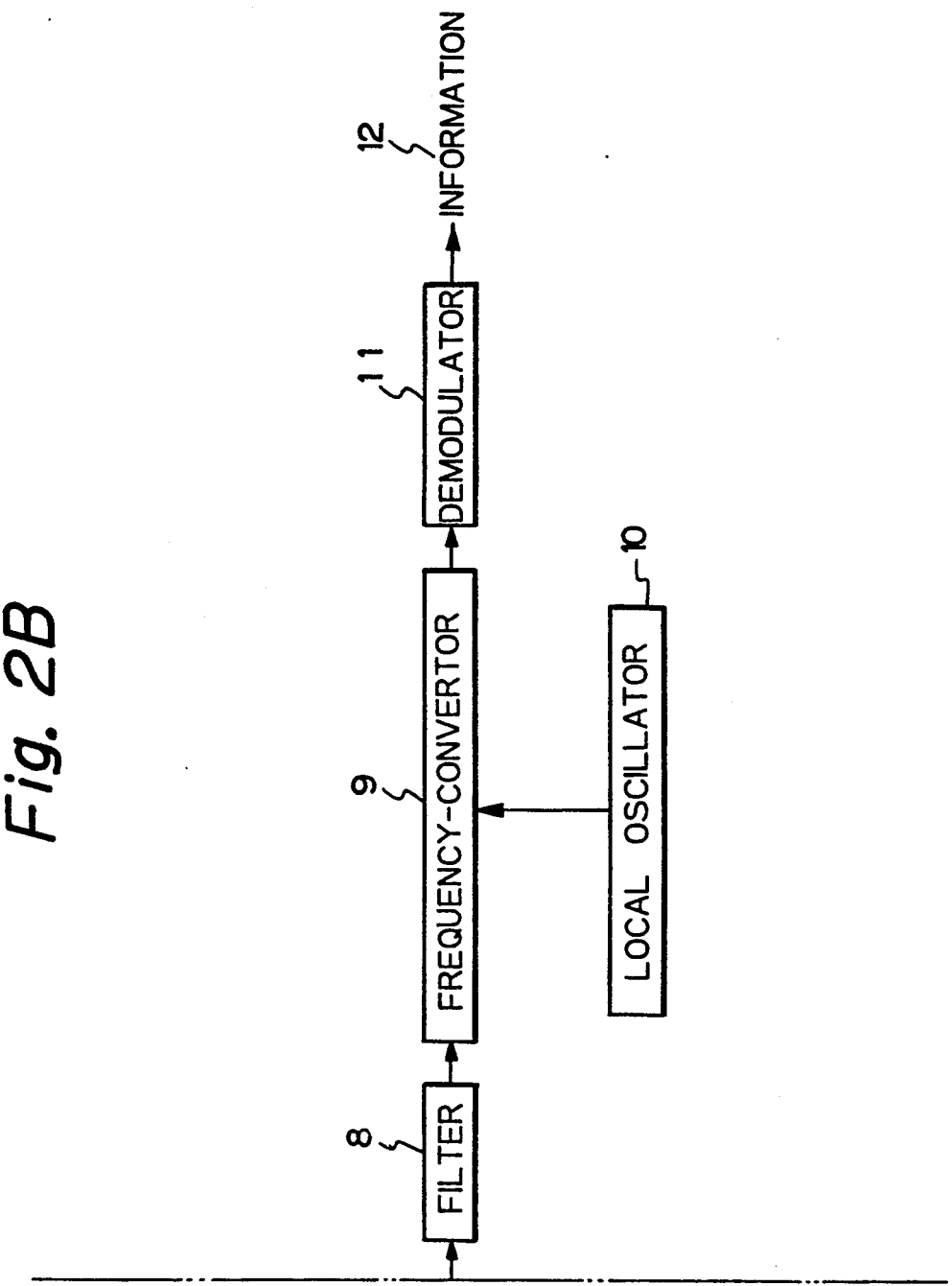

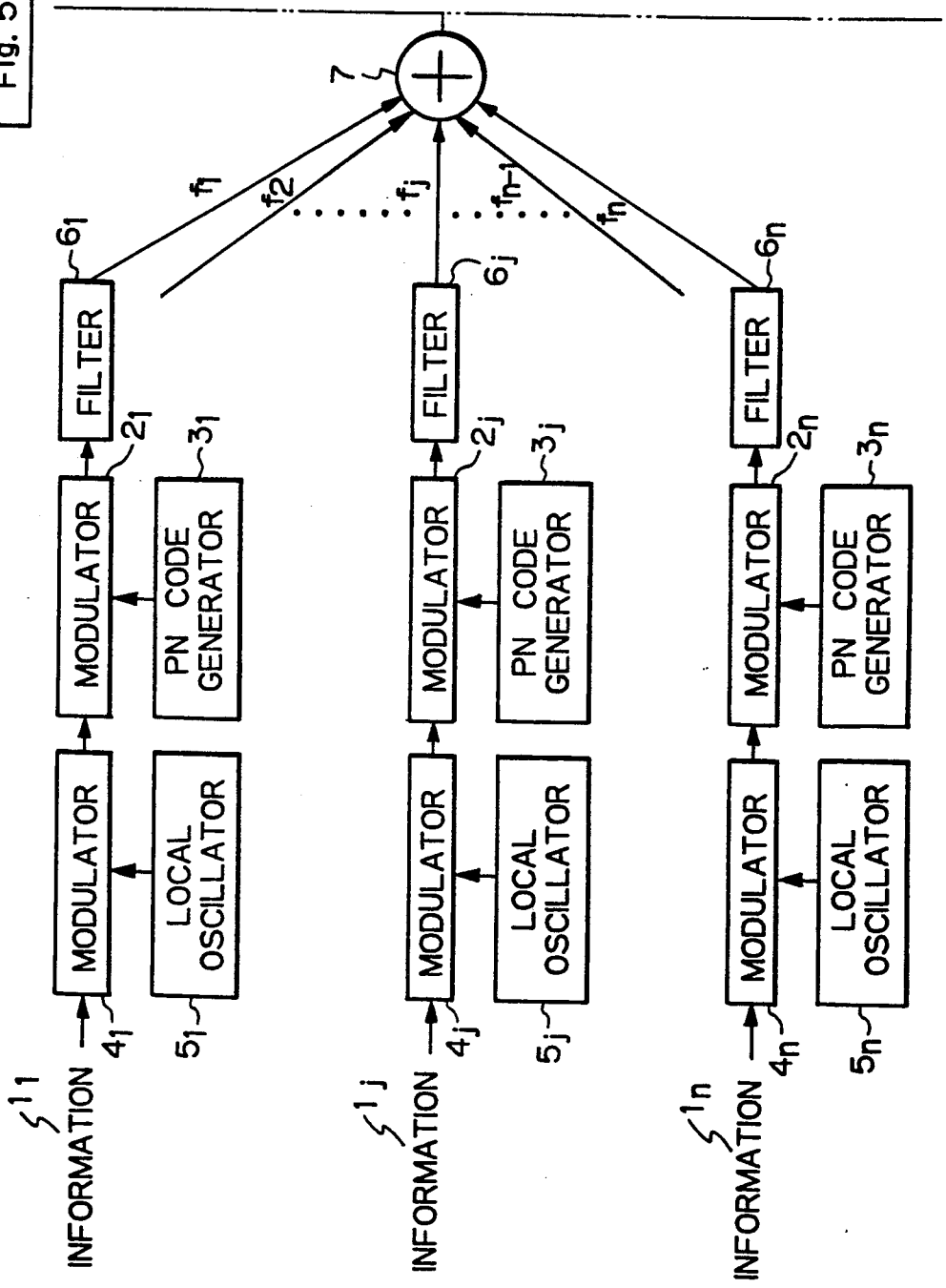

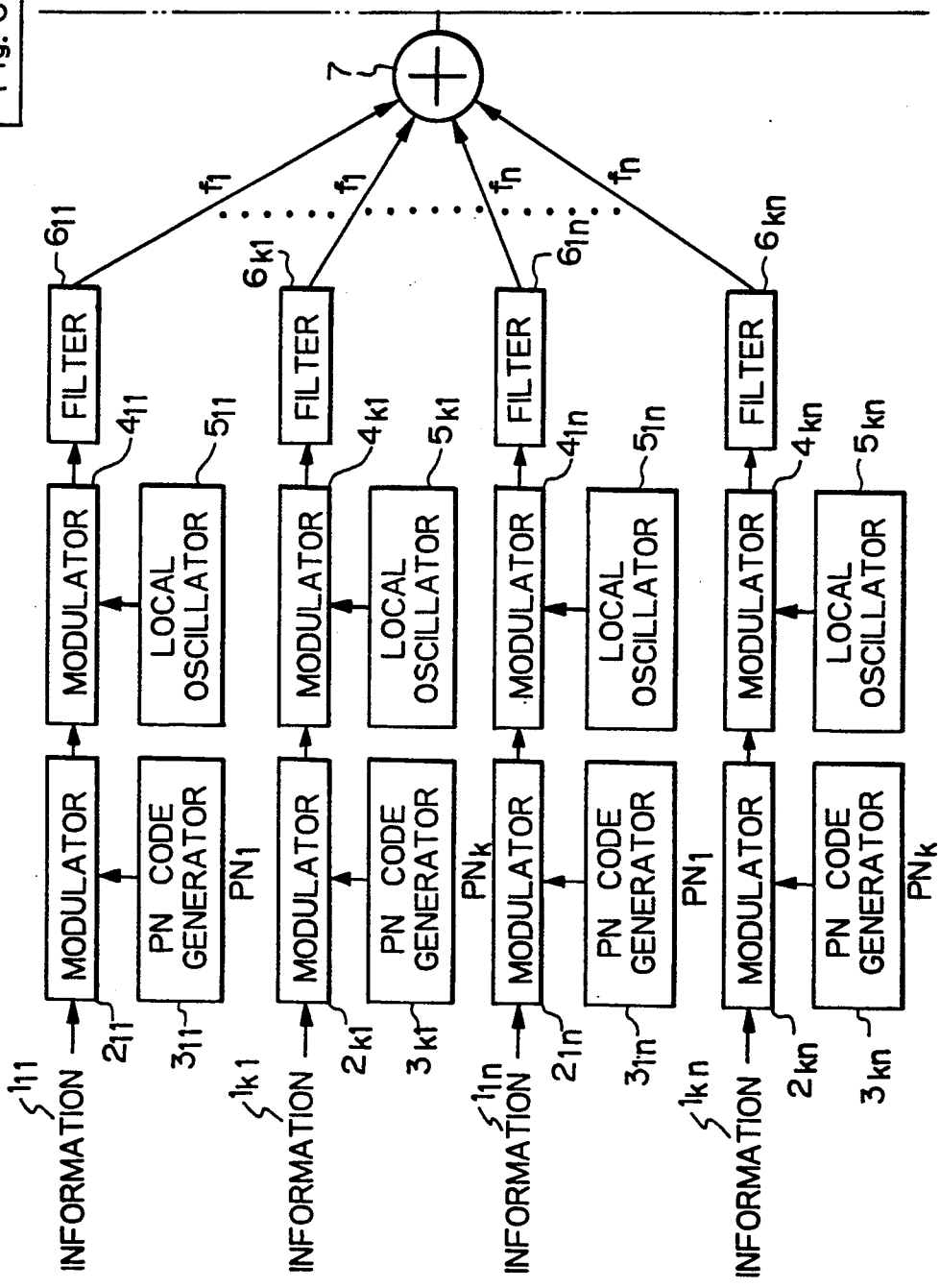

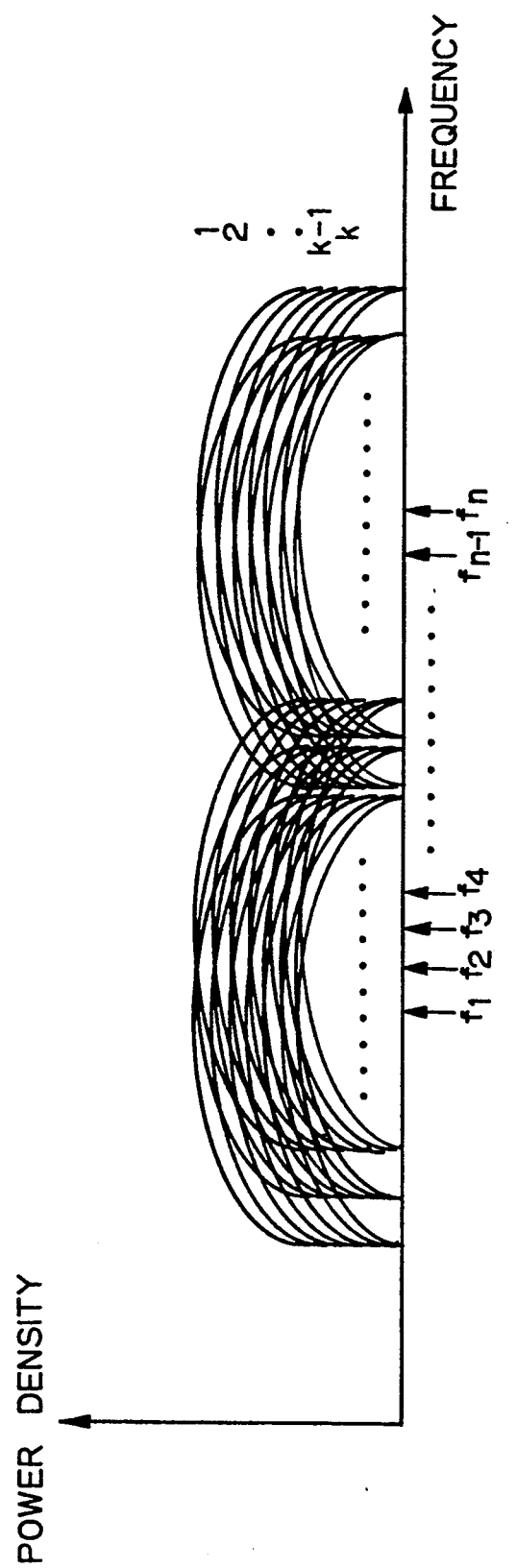

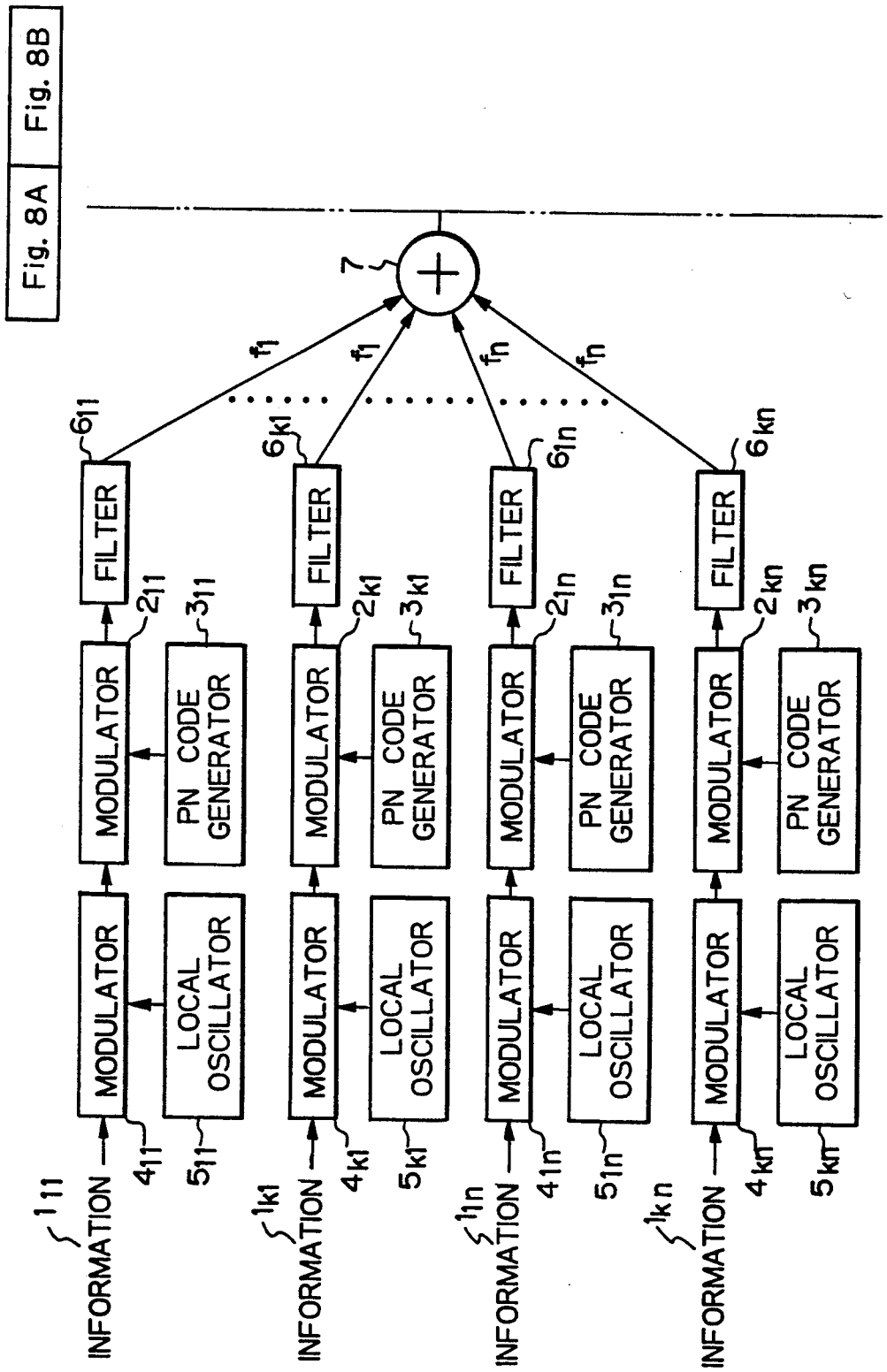

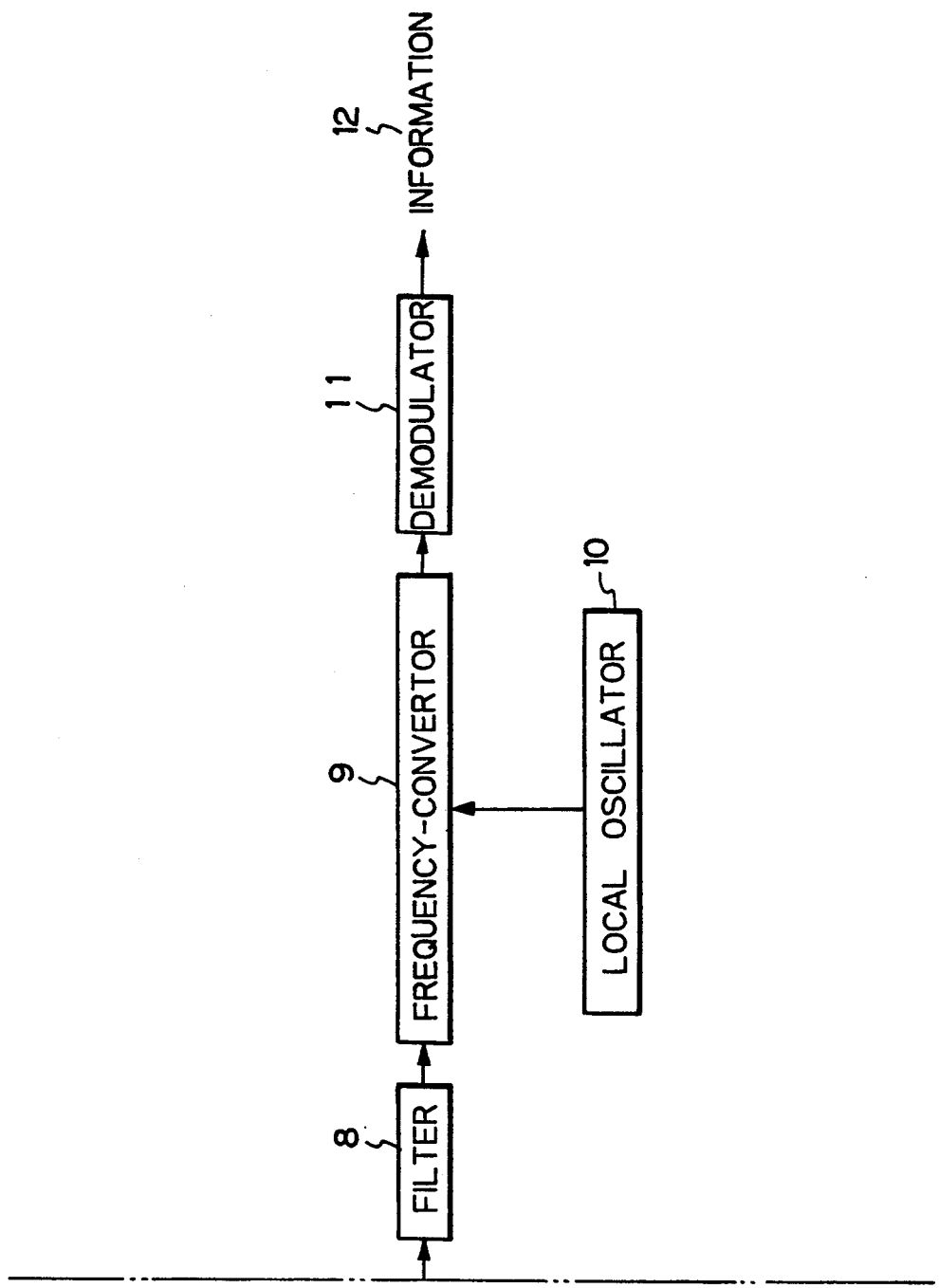

SPREAD SPECTRUM COMMUNICATION SYSTEM

BACKGROUND OF THE INVENTION

1. Field of the Invention

The present invention relates to a direct sequence spread spectrum (DS-SS) communication system used for multiple access communications, such as satellite communications, cellular mobile communications, indoor wireless communications for computer remote terminal, and wireless local area network (LAN) communications.

2. Description of the Related Art

One application of DS-SS is code division multiple access (CDMA) technique, which is considered to be a candidate multiple access method for future telecommunication systems. In CDMA system, different kinds of pseudo-random noise (PN) codes and the same carrier frequency are assigned to each communication station. Since all stations use the same frequency band, each station shall be distinguished with the assigned PN code by using the property that the cross correlation among PN codes is very low.

In practice, according to the conventional CDMA communication system, information signals are spectrum spread by different PN codes first, and then the spectrum spread signals modulate carriers having the same frequency $f_a$ at respective transmit stations. Thus modulated signals are transmitted from respective transmit stations to receive stations after filtered by respective band pass filters. At one of the receive stations, the transmitted signals are frequency-converted by a local oscillator, and then despread by the same PN code used for spectrum spreading of desired information. Since PN code indicates strong correlation only with the signal spread by the same PN code, the desired information signal can be selectively obtained among the various received signals.

As shown in FIG. 1, according to the conventional CDMA communication system, spectrums of received signal from the transmit stations 1 to k (k is the number of transmit stations communicating simultaneously) are completely overlapped which each other because their center (carrier) frequencies coincide at the frequency $f_a$.

Generally, as for PN codes for signal spectrums spreading in the DS-SS communication system, maximum length sequences are utilized. The number of existing maximum length sequences is small when the code length thereof is short, for example, the number is only 18 when the code length thereof is 127 bits, 16 when 255 bits, and 48 when 511 bits. Therefore, in order to accommodate more stations simultaneously in the CDMA communication system in which each of the transmit stations is distinguished only with the assigned PN code, maximum length sequences with extremely longer code length, in other words maximum length sequences having greater number of independent sequences would be required. The longer code length of the PN code sequences, the more complicating PN code generation process, construction of correlators, and also demodulation process.

In the CDMA system, the same PN code cannot be used at the same carrier frequency. Thus, according to the conventional CDMA system, in case that more transmit stations than the number of the existing PN codes are required in the system, a plurality of frequency bands should be employed to reuse the PN code as shown in FIG. 1. In this figure, one set of 1 to k stations with the carrier frequency $f_a$ and the other set of 1 to k stations with the carrier frequency $f_b$ are illustrated. However, this configuration requires m times of frequency band width in order to accommodate m times of the transmit stations simultaneously, namely to reuse the same PN code for m times.

Furthermore, in case that PN codes are not assigned permanently to the respective stations but assigned corresponding to the demands for communication, it is necessary that each station has a correlator device which can recognize all the PN code sequences used therein. This results in too many matched filters whose code patterns are physically fixed such as surface acoustic wave (SAW) filters, or the device which has the programmable functions. A digital logic LSI which can respond to various PN code sequences may be used. However, in case of using the PN codes with very long code length, information bit rate or operation speed thereof will be limited due to the heating or power consumption problems.

SUMMARY OF THE INVENTION

It is therefore an object of the present invention to provide a spread spectrum communication system which is able to perform multiple access by using a single PN code commonly assigned to all simultaneous communication stations.

According to the present invention, a spread spectrum communication system having a plurality of transmit ends capable of simultaneous communications and at least one receive end is provided. Each of the transmit ends modulates digital information by a PN code to provide a spread signal, modulates a carrier by the above spread signal to provide a modulated signal, and then transmits the modulated signal to the receive end (or each of the transmit ends modulates a carrier by digital information to provide modulated signal, modulates the modulated signal by a PN code to provide a spread signal, and then transmits the spread signal to the receive end). These transmit ends use the same PN code for spreading the respective digital information (or the respective modulated signals) and use the carriers having slightly different frequencies from each other, so that spectrums of at least two of the modulated signals (or the spread signals) overlap each other. The receive end receives signals transmitted from the transmit ends, frequency-converts the received signal to adjust the converted frequency of the desired signal to that of correlator, and calculates a correlation between the converted signal and the commonly assigned PN code to recover the digital information transmitted from the desired transmit end. This receive end can extract a signal in which a center frequency corresponds to that of a correlator while keeping the effect of other signals very low.

According to the present invention, since frequencies of the carriers in the respective transmit ends are different from each other, the same PN code can be commonly assigned to all transmit ends simultaneously. Therefore, the multiple access communication using the spread spectrum technique can be achieved by using only a PN code commonly assigned to all transmit stations, although a frequency band width required for the system will slightly increase as the band width of the conventional communication system.

Thus, the spread spectrum communication system according to the present invention is applicable to various simultaneous communications, such as satellite communications, cellular mobile communications, indoor wireless communications for private branch exchange (PBX), and wireless LAN communications, with extremely simple and cheap construction and having a small size.

It is preferable that the difference between the carrier frequencies of the respective transmit ends is predetermined to a small value so that most of the spectrums of the adjacent modulated signals (or spread signals) overlap each other.

It is also preferable that the difference between the carrier frequencies of the respective transmit ends is substantially equal to a frequency corresponding to a reciprocal of a frame period of the PN code, which is equal to a symbol rate of the digital information or an integer multiple thereof.

It is also preferable that the difference between the carrier frequencies of the respective transmit ends may be larger than a frequency corresponding to a reciprocal of a frame period of the PN code, which is equal to a symbol rate of the digital information, but so small that most of the spectrums of the adjacent modulated signals (or the spread signals) overlap each other.

The receive end may include a correlator, matched to the PN code, for calculating a correlation between the converted signal and the PN code to recover the desired digital information.

The receive end may include a band pass filter and a frequency-converter, for extracting a signal having a center frequency which corresponds to that of the correlator.

Furthermore, according to the present invention, a spread spectrum communication system having a plurality of transmit ends capable of simultaneous communications and at least one receive end is provided. Each of the transmit ends modulates digital information by a PN code to provide a spread signal, modulates a carrier by the spread signal to provide a modulated signal, and then transmits the modulated signal to the receive end (or each of the transmit ends modulates a carrier by digital information to provide a modulated signal, modulates the modulated signal by a PN code to provide a spread signal, and then transmits the spread signal to the receive end). These transmit ends are divided into a plurality of groups. The transmit ends in the same group use carriers having the same frequency and use different PN codes assigned to the respective transmit ends for spreading the respective digital information (or the respective modulated signals) in a conventional manner. PN codes are reused among the groups where CDMA communication is performed in a conventional manner, but each group has a different center frequency to avoid the mutual interference among groups. The receive end receives signals transmitted from the transmit ends to provide a received signal, frequency-converts the received signal to provide a converted signal, and calculates a correlation between the converted signal and the PN code to recover the desired digital information. This receive end selectively extracts a signal of interest by selecting both center frequency and PN code assigned to a signal of interest at the transmit end.

Further objects and advantages of the present invention will be apparent from the following description of the preferred embodiments of the invention as illustrated in the accompanying drawings.

BRIEF DESCRIPTION OF THE DRAWINGS

FIG. 2 constituted from FIGS. 2A and 2B schematically shows a preferred embodiment of a spread spectrum communication system according to the present invention;

FIG. 7 shows received signal spectrum in the embodiment shown in FIG. 6; and

FIG. 8 constituted from FIGS. 8A and 8B schematically shows an another embodiment of a spread spectrum communication system according to the present invention applied to a conventional CDMA system.

DESCRIPTION OF THE PREFERRED EMBODIMENTS

Figure 1:
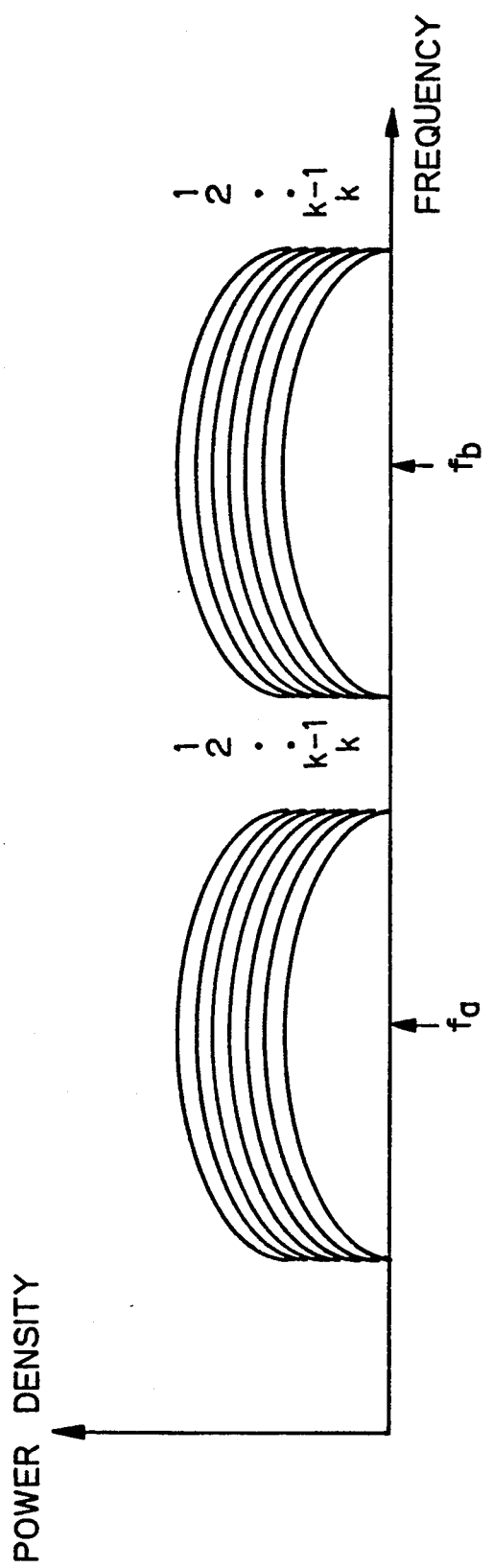
FIG. 1 shows received signal spectrum according to the conventional spread spectrum communication system.

FIG. 2 schematically shows a DS-SS communication system having n simultaneous transmit stations as a preferred embodiment according to the present invention.

In FIG. 2, reference numerals $1_1$ to $1_n$ denote binary coded information signals in the respective simultaneous transmit stations. PN codes from generators $3_1$ to $3_n$ are provided to first modulators $2_1$ to $2_n$ of the respective transmit stations, respectively. The first modulators $2_1$ to $2_n$ binary multiply the information signals $1_1$ to $1_n$ applied thereto with the same PN code $PN_1$ fed from the PN code generators $3_1$ to $3_n$ to produce base band signals, respectively.

The first modulators $2_1$ to $2_n$ are further connected to second modulators $4_1$ to $4_n$ of the respective transmit stations. These second modulators $4_1$ to $4_n$ are phase modulators following local oscillators $5_1$ to $5_n$, respectively. The modulators $4_1$ to $4_n$ modulate carriers fed from the respective local oscillators $5_1$ to $5_n$ by the base band signals from the first modulators $2_1$ to $2_n$, respectively. It is important that the frequencies of the carriers fed from the local oscillators $5_1$ to $5_n$ and applied to the modulators $4_1$ to $4_n$ are different from each other as shown by $f_1$ to $f_n$ in FIG. 2. However, as will be mentioned later, the difference of the carrier frequencies $f_1$ to $f_n$ is not so much but a little in comparison with the width of the PN code.

In respective transmit stations, band pass filters $6_1$ to $6_n$ are connected to the second modulators $4_1$ to $4_n$, for extracting frequency component to be transmitted from the modulated signals. In this embodiment, all the transmit stations transmit data at the same information bit rate and the same spreading code chip rate.

It should be noted that the spread spectrum communication is applicable in both wire and radio communication systems. Reference numeral 7 in FIG. 2 represents that the signals transmitted from the respective transmit stations are multiplexed during propagation through transmission medium such as wire or radio communication medium.

In a receive station, a band pass filter 8 for extracting frequency component necessary for demodulating is connected to a frequency-convertor 9. The frequency-converter 9 is connected to a local oscillator 10, whose frequency is determined in accordance with the carrier frequency of the desired signal, and to a demodulator 11 constituted by a correlator for supplying recovered information signals 12.

As for the correlator 11, convolution integrator and matched filter both typically realized with a SAW device in the intermediate frequency level, and those realized with a digital logic LSI and a charge coupled device (CCD) in the baseband level are well known.

Hereinafter, the operation of the DS-SS communication system of this embodiment will be described in detail.

In the first transmit station, the information signal $1_1$ is binary multiplied with PN code $PN_1$ at the first modulator $2_1$, then at the output of the second modulator $4_1$, the modulated signal with the carrier frequency $f_1$ assigned to this transmit station is obtained. The modulated signal is transmitted to receive stations after passing the band pass filter $6_1$. Similar to this, in the jth station, the information signal $1_j$ is binary multiplied with PN code $PN_1$ at the first modulator $2_j$, then at the second modulator $4_j$, the modulated signal with the carrier frequency $f_j$ assigned to this jth transmit station is obtained. The modulated signal is transmitted to receive stations after passing the band pass filter $6_j$.

The modulated signals transmitted from the respective transmit stations 1 to n will have therefore different carrier frequencies $f_1$ to $f_n$, respectively, and are multiplexed together during propagation. Thus, received signals at the receive side will have signal spectrums as shown FIG. 3. Since the difference between the carrier frequencies $f_1$ to $f_n$ is extremely small in comparison with each spectrum bandwidth of the modulated signal, most of the spectrums of the adjacent signals overlap each other.

Figure 3:
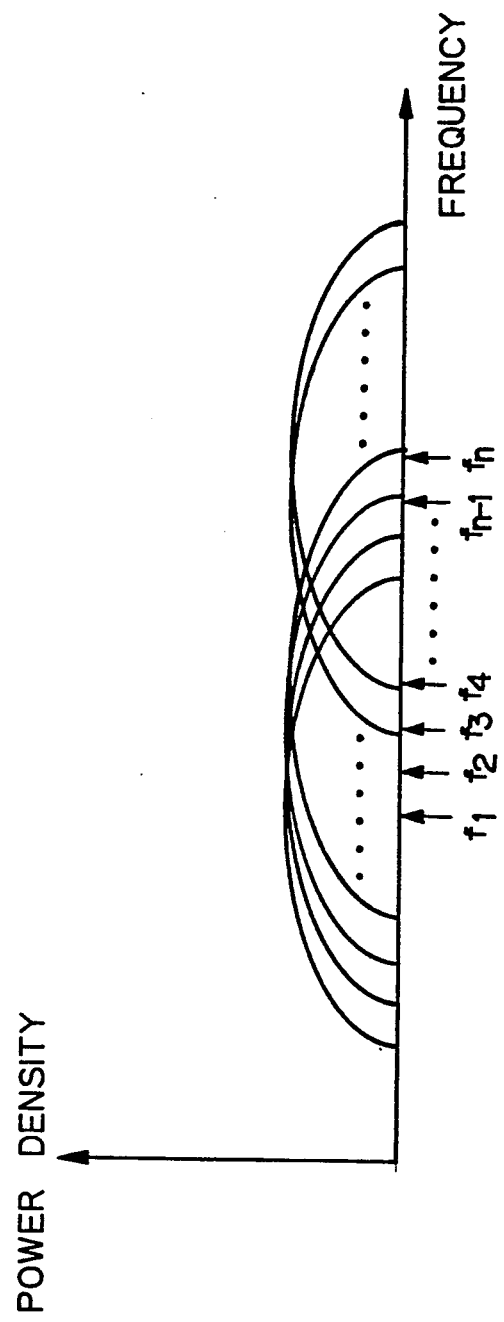
FIG. 3 shows received signal spectrum in the embodiment shown in FIG. 2.

According to the conventional CDMA communication system, the frequencies of the carriers in the respective transmit stations are the same ($f_a$), and the PN codes assigned to the respective stations are different from each other ($PN_1$ to $PN_n$). Contrary to this, according to the present invention, frequencies of the carriers in the respective transmit stations are different from each other ($f_1$ to $f_n$), and the PN codes assigned to all the stations are the same code ($PN_1$). As a result, signal spectrums of the received signals according to the present invention differ from that of the conventional art as illustrated in FIGS. 1 and 3, respectively.

In the receive station, the received signals are applied to the band pass filter 8 for extracting a frequency component necessary for demodulation. The extracted frequency component is frequency-converted so that the desired signal is selectively demodulated. Since the carrier frequency of the desired signal (e.g. $f_j$) has been known, the corresponding local frequency can be easily provided by the oscillator 10, which is needed for selective demodulation. As a result of this frequency-conversion, the center frequency of the signal from the desired transmit station will become substantially equal to the input center frequency of the demodulator 11.

The demodulator 11 calculates correlation between the PN code $PN_1$ used for spreading at the transmit station and the input signal for selective demodulation. In accordance with the obtained value of the correlation, desired information signal 12 can be recovered.

Figure 4:
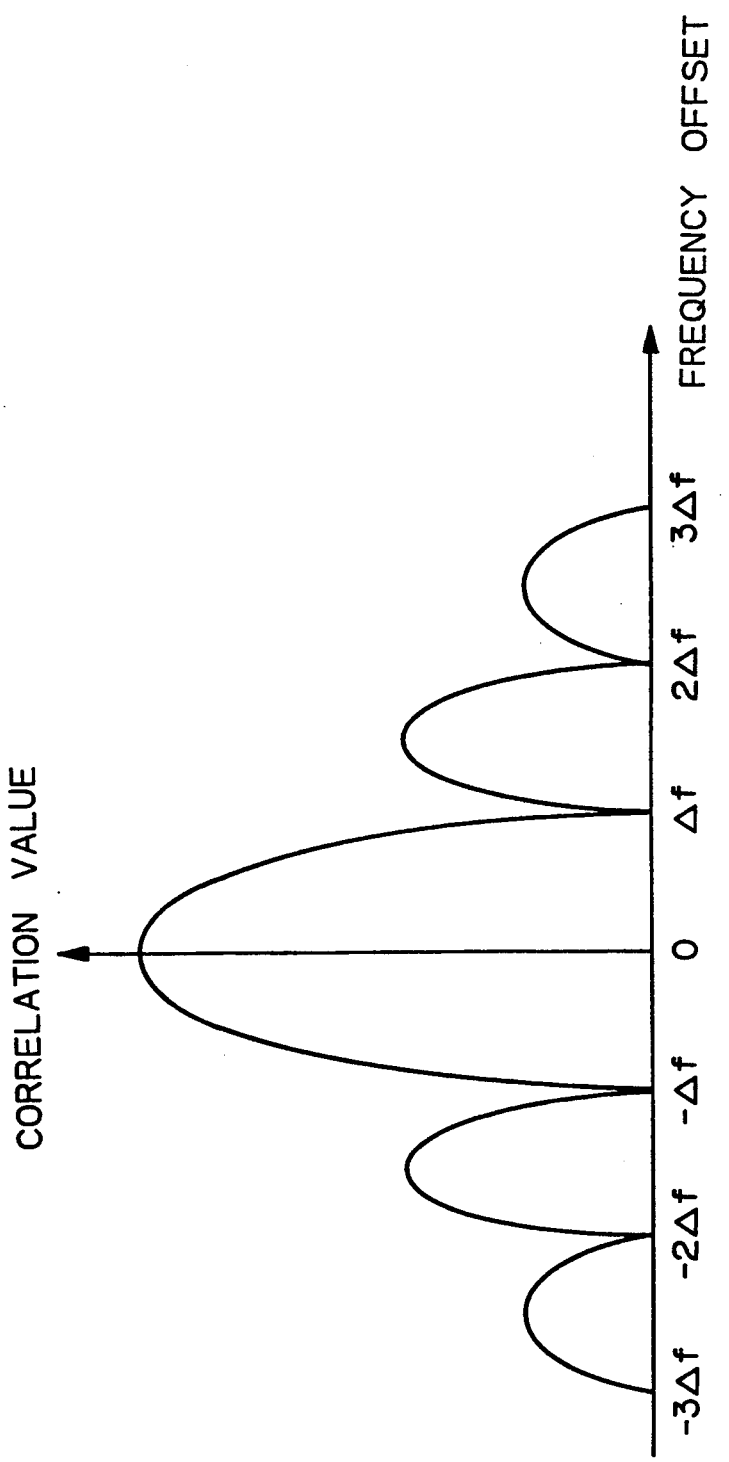
FIG. 4 shows variation of correlation value with respect to the frequency offset of an input signal applied to a correlator.

An extent of interference due to an adjacent signals against the desired signal will now be described with reference to FIG. 4 which shows the correlation characteristics when a spread spectrum signal has a frequency offset against the nominal input frequency of the correlator.

As is apparent from this figure, if the frequency offset is zero, the value of the correlation is equal to 1. As the frequency difference increases from zero, the correlation value decreases. When the frequency difference increases up to $\pm\Delta f$, the correlation value will reach zero. The correlation value will also reach zero at every time when the difference is equal to $\pm 2\Delta f$, $\pm 3\Delta f$, .... The peaks of the correlation value gradually decrease as the difference increases. $\Delta f$ is a frequency corresponding to a reciprocal of a single time (frame) period of the PN code, which is equal to a symbol rate of the transmit information.

It will be understood that an adjacent signal having a carrier frequency apart from the carrier frequency of the desired signal by a frequency difference of $\Delta f$ or an integer multiple thereof will no longer interfere with the demodulation of the desired signal.

It is preferable that the frequency difference is equal to $\Delta f$ or an integer multiple thereof. However, in practice, the carrier frequency difference may be determined to a value near $\Delta f$ or a value larger than $\Delta f$ but not so large so that most of the spectrums thereof overlap.

As mentioned in detail, according to this embodiment, a multiple access in the spread spectrum communication is available by using a single as many PN code only, without requiring PN codes as the simultaneous transmit stations. Furthermore, a frequency band width required for the communication system according to this embodiment will never increase as much compared with the band width of the conventional communication system.

Therefore, the spread spectrum communication system according to the present invention is applicable to simultaneous communications, such as mobile communications in which power consumption of the terminal is severely limited, wireless LAN communications, and wireless PBX communications, with extremely simple and cheap construction and having a small size.

Figure 5B:
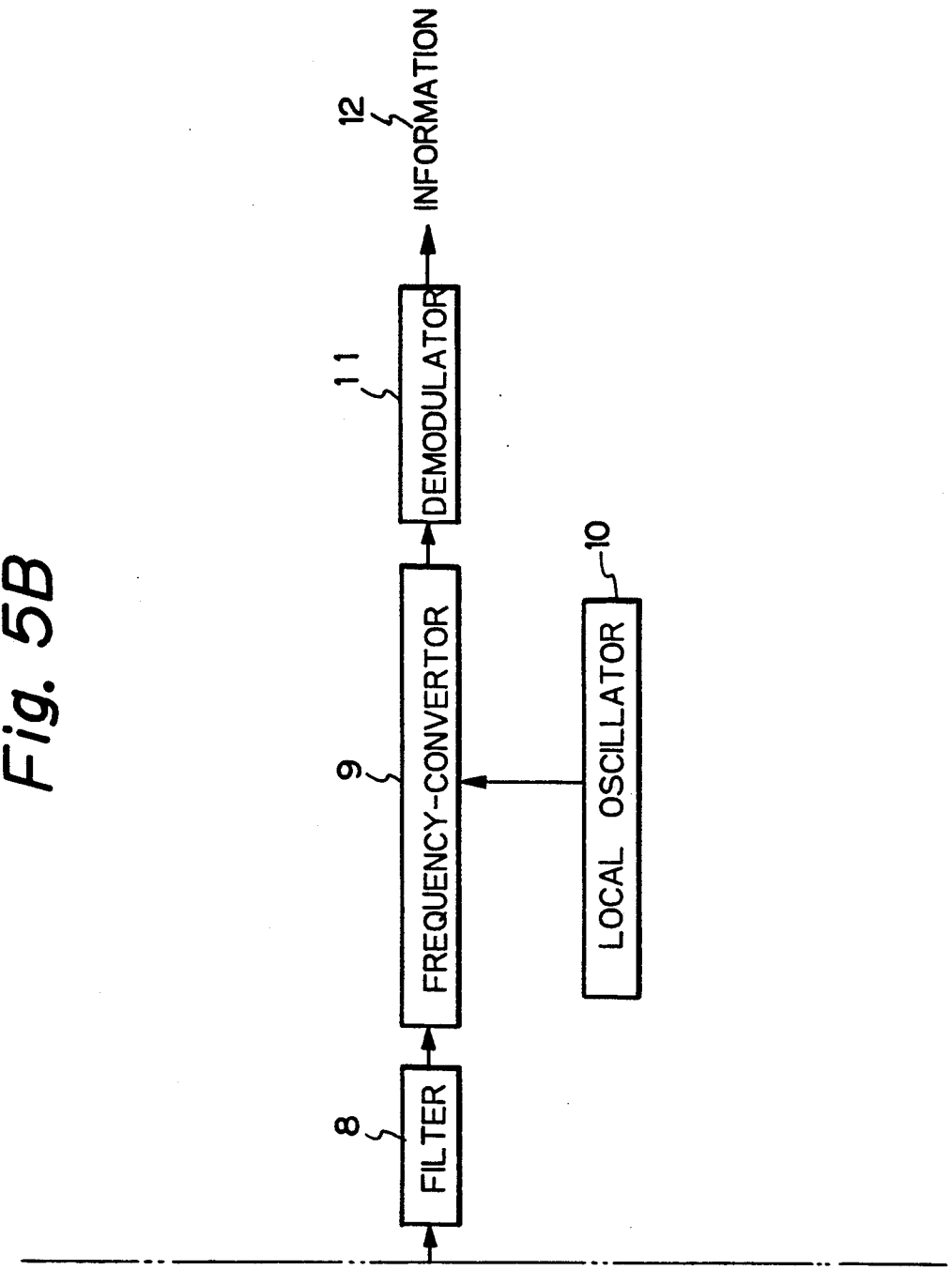
FIG. 5 constituted from FIGS. 5A and 5B schematically shows an another embodiment of a spread spectrum communication system according to the present invention.

FIG. 5 schematically shows a DS-SS communication system having n simultaneous transmit stations as another embodiment according to the present invention.

The construction and operations of this embodiment are the same as those of the embodiment shown in FIG. 2, except that, in the respective transmit stations, modulators $2_1$ to $2_n$ and PN code generators $3_1$ to $3_n$ are located downstream of modulators $4_1$ to $4_n$ and local oscillators $5_1$ to $5_n$, respectively. The advantages induced from this embodiment is also similar to that of the embodiment of FIG. 2.

Figure 6B:
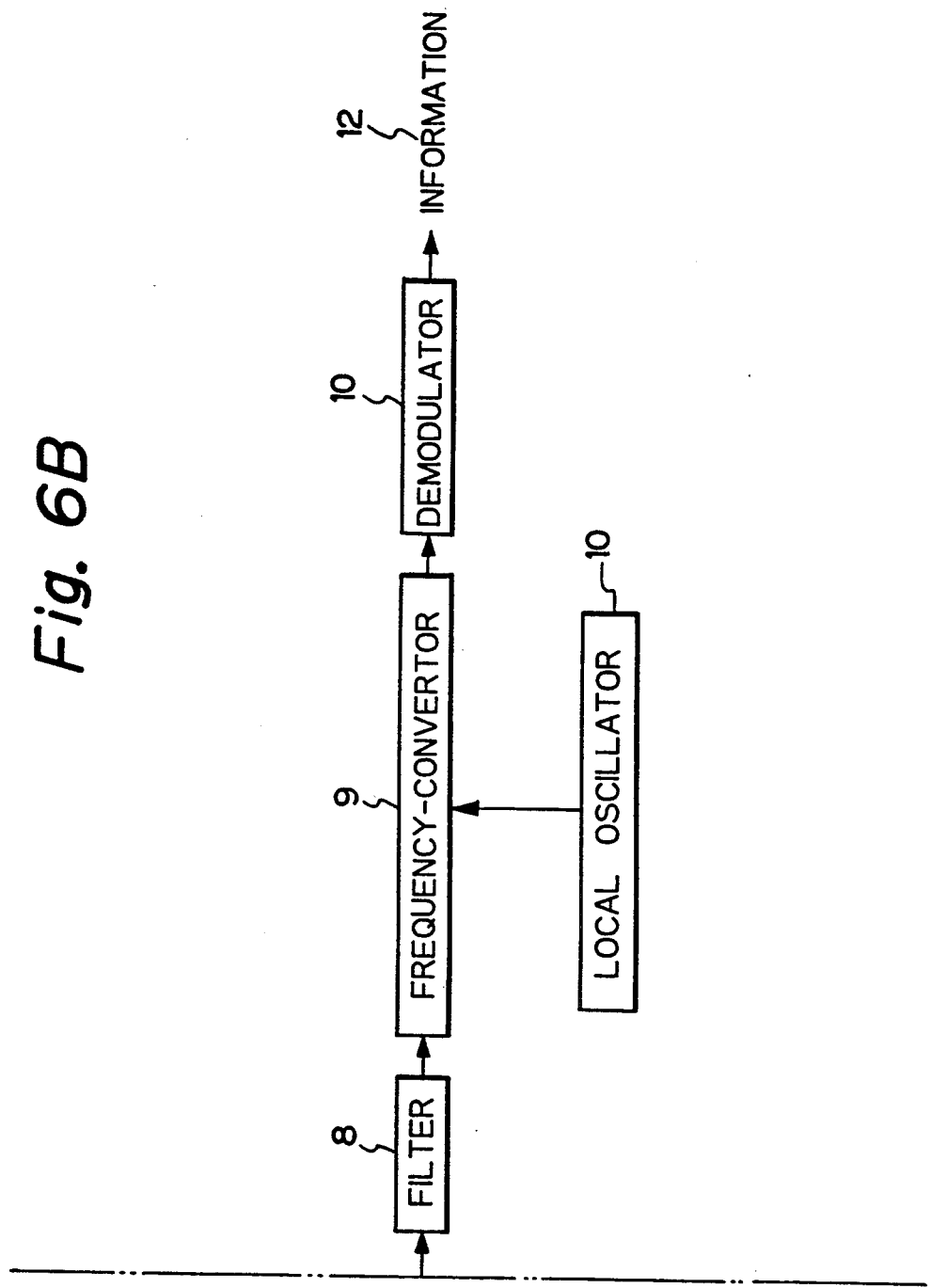
FIG. 6 constituted from FIGS. 6A and 6B schematically shows a further embodiment of a spread spectrum communication system according to the present invention applied to a conventional CDMA system.

FIG. 6 schematically shows a DS spread spectrum communication system having kn simultaneous transmit stations as a further embodiment according to the present invention.

According to this embodiment, the concept of the present invention is applied to groups 1 to k of the simultaneous transmit stations. Namely, frequencies of the carriers in the respective groups are different from each other ($f_1$ to $f_n$), and the same PN code set ($PN_1$ to $PN_k$) is assigned to all the groups, while, in each group, the frequencies of the carriers in the respective transmit stations are the same and the PN codes assigned to the respective stations are different from each other ($PN_1$ to $PN_n$) in a conventional manner.

In FIG. 6, reference numerals $1_{11}$ to $1_{k1}$ denote binary coded information signals in the respective simultaneous transmit stations of a first group 1, and $1_{1n}$ to $1_{kn}$ denote binary coded information signals in the respective simultaneous transmit stations of an nth group n. First modulators $2_{11}$ to $2_{k1}$ of the respective transmit stations in the first group are connected to PN code generators $3_{11}$ to $3_{k1}$, respectively. First modulators $2_{1n}$ to $2_{kn}$ of the respective transmit stations in the nth group are connected to PN code generators $3_{1n}$ to $3_{kn}$, respectively. The first modulators $2_{11}$ and $2_{k1}$ in the first group binary multiply the information signals $1_{11}$ to $1_{k1}$ applied thereto with the different PN codes $PN_1$ to $PN_k$ fed from the respective PN code generators $3_{11}$ to $3_{k1}$ to produce base band signals, respectively. The first modulators $2_{1n}$ and $2_{kn}$ in the nth group binary multiply the information signals $1_{1n}$ to $1_{kn}$ applied thereto with the different PN codes $PN_1$ to $PN_k$ fed from the respective PN code generators $3_{1n}$ to $3_{kn}$ to produce base band signals, respectively.

The first modulators $2_{11}$ to $2_{kn}$ are further connected to second modulators $4_{11}$ to $4_{kn}$ of the respective transmit stations. These second modulators $4_{11}$ to $4_{kn}$ are phase modulators connected to local oscillators $5_{11}$ to $5_{kn}$, respectively. The modulators $4_{11}$ to $4_{kn}$ modulate carriers fed from the respective local oscillators $5_{11}$ to $5_{kn}$ by the base band signals from the first modulators $2_{11}$ to $2_{kn}$, respectively. It is important that the frequency of the carriers fed from the local oscillators $5_{11}$ to $5_{k1}$ and applied to the modulators $4_{11}$ to $4_{k1}$ in the first group is the same ($f_1$), but different from the frequency $f_n$ of the carriers fed from the local oscillators $5_{1n}$ to $5_{kn}$ and applied to the modulators $4_{1n}$ to $4_{kn}$ in the nth group. The difference of the carrier frequencies $f_1$ to $f_n$ is not as much but a little in comparison with the bandwidth of the PN code.

In respective transmit stations, band pass filters $6_{11}$ to $6_{kn}$ are connected to the second modulators $4_{11}$ to $4_{kn}$, for extracting a frequency component to be transmitted from the modulated signals. In this embodiment, all the transmit stations transmit data at the same information bit rate and the same spreading code chip rate.

It should be noted that the spread spectrum communication is applicable in both wire and radio communication systems. Reference numeral 7 in FIG. 6 represents that the signals transmitted from the respective transmit stations are multiplexed during propagation through a transmission medium such as a wire or a radio communication medium.

In a receive station, a band pass filter 8 for extracting frequency component necessary for demodulating is connected to a frequency-convertor 9. The frequency-converter 9 is connected to a local oscillator 10 whose frequency is determined in accordance with the carrier frequency of the desired signal, and to a demodulator 11 constituted by a correlator for recovering information signals 12.

As for the correlator 11, a convolution integrator and a matched filter both typically are realized with a SAW device in the intermediate frequency level, and those realized with a digital logic LSI and a charge coupled device (CCD) in the baseband level are well known.

Hereinafter, the operation of the DS-SS communication system of this embodiment will be described in detail.

In the transmit stations of the first group, the binary information signals $1_{11}$ to $1_{k1}$ are multiplied with different PN codes $PN_1$ to $PN_k$ at the first modulators $2_{11}$ to $2_{k1}$, respectively. Then, at the outputs of the second modulators $4_{11}$ to $4_{k1}$, the modulated signals with the carrier frequency $f_1$ assigned to all the transmit stations of the first group are obtained. The modulated signals are transmitted to receive stations after passing the band pass filters $6_{11}$ to $6_{k1}$, respectively. Similar to this, in the transmit stations of the nth group, the information signals $1_{1n}$ to $1_{kn}$ are binary multiplied with different PN codes $PN_1$ to $PN_k$ at the first modulators $2_{1n}$ to $2_{kn}$, respectively. Then, at the outputs of the second modulators $4_{1n}$ to $4_{kn}$, the modulated signals with the carrier frequency $f_n$ assigned to all the transmit stations of this nth group are obtained. The modulated signals are transmitted to receive stations after passing the band pass filters $6_{1n}$ to $6_{kn}$, respectively.

The modulated signals transmitted from the transmit stations in the different groups 1 to n will have therefore different carrier frequencies $f_1$ to $f_n$, respectively, and are multiplexed together during propagation. Thus, received signals at the receive side will have signal spectrums as shown in FIG. 7. Since the difference between the carrier frequencies $f_1$ to $f_n$ is extremely small in comparison each spectrum bandwidth of the modulated signal, most of the spectrums of the adjacent signals overlap each other. In each group, spectrums are completely overlap each other so that their carrier frequencies coincide at the frequency.

In the receive station, the received signals are applied to the band pass filter 8 for extracting frequency component necessary for demodulating the signal transmitted from the desired transmit station. The extracted frequency component is frequency-converted so that the desired signal is selectively demodulated. Since a carrier frequency of the desired group (e.g. $f_n$) has been known, the corresponding local frequency can be easily provided by the oscillator 10, which is needed for selective demodulation. As a result of this frequency-conversion, the center frequency of the converted signal will be substantially equal to the input center frequency of the demodulator 11.

The demodulator 11 calculates correlation between the PN codes used for spreading at the desired transmit station and the input signal for selective demodulation. In accordance with the obtained value of the correlation, desired information signal 12 can be recovered.

It is preferable that the frequency difference among $f_1$ to $f_n$ is equal to $\Delta f$ or an integer multiple thereof. However, in practice, the carrier frequency difference may be determined to a value near $\Delta f$ or a value larger than $\Delta f$ but not too large so that most of the spectrums thereof are overlap.

As mentioned in detail, according to this embodiment, though the groups each of which is constituted by conventional CDMA communication stations, can use the same PN code set simultaneously, more different carrier stations can be accommodated in the same band without the limitation of the available number of PN codes.

FIG. 8 schematically shows a DS-SS communication system having kn simultaneous transmit stations as a still further embodiment according to the present invention.

The construction and operations of this embodiment are the same as those of the embodiment shown in FIG. 6, except that, in the respective transmit stations, modulators $2_{11}$ to $2_{kn}$ and PN code generators $3_{11}$ to $3_{kn}$ are located downstream of modulators $4_{11}$ to $4_{kn}$ and local oscillators $5_{11}$ to $5_{kn}$, respectively. The advantages induced from this embodiment is also similar to that of the embodiment of FIG. 6.

Many widely different embodiments of the present invention may be constructed without departing from the spirit and scope of the present invention. It should be understood that the present invention is not limited to the specific embodiments described in the specification, except as defined in the appended claims.

What is claimed is:

1. A spread spectrum communication system comprising:
   a plurality of transmit ends; and
   at least one receive end,
   each of said transmit ends a) spreading digital information by a PN code to provide a spread signal, b) modulating a carrier by said spread signal to provide a modulated signal, and c) then transmitting said modulated signal to said receive end,
   said receive end a) receiving signals transmitted from said transmit ends to provide a received signal, and b) calculating a correlation between the received signal and said PN code to recover the digital information transmitted from the desired transmit end, wherein
   said transmit ends use the same PN code commonly assigned to all users for spreading the respective digital information and use carriers having different frequencies from each other so that spectrums of at least two of said modulated signals overlap each other; and
   said receive end demodulates a signal having a center frequency which corresponds to the carrier frequency of the desired transmit end without being affected by other signals.

2. A system as claimed in claim 1, wherein the difference between said carrier frequencies of the respective transmit ends is a predetermined value so that the spectrums of the adjacent modulated signals substantially overlap each other.

3. A system as claimed in claim 1, wherein the difference between said carrier frequencies of the respective transmit ends is substantially equal to a frequency corresponding to a reciprocal of a frame period of said PN code, which is equal to a symbol rate of the digital information or an integer multiple thereof.

4. A system as claimed in claim 1, wherein the difference between said carrier frequencies of the respective transmit ends is larger than a frequency corresponding to a reciprocal of a frame period of said PN code, which is equal to a symbol rate of the digital information, wherein the spectrums of the adjacent modulated signals substantially overlap each other.

5. A system as claimed in claim 1, wherein said receive end comprises a correlator, matched to said PN code, for calculating a correlation between the received signal and said PN code to recover the digital information transmitted from the desired transmit end.

6. A system as claimed in claim 5, wherein said receive end comprises a band pass filter and a frequency-converter, for demodulating a signal having a center frequency which corresponds to the carrier frequency of the desired transmit end.

7. A spread spectrum communication system comprising:
   a plurality of transmit ends; and
   at least one receive end,
   each of said transmit ends a) modulating a carrier by digital information to provide a modulated signal, b) spreading said modulated signal by a PN code to provide a spread signal, and c) then transmitting said spread signal to said receive end,
   said receive end a) receiving signals transmitted from said transmit ends to provide a received signal, and b) calculating a correlation between the received signal and said PN code to recover the digital information transmitted from the desired transmit end, wherein
   said transmit ends use the same PN code commonly assigned to all users for spreading the respective modulated signals and use carriers having different freqeuncies from each other so that spectrums of at least two of said spread signals overlap each other; and
   said receive end demodulates a signal having a center frequency which corresponds to the carrier frequency of the desired transmit end without being affected by other signals.

8. A system as claimed in claim 7, wherein the difference between said carrier frequencies of the respective transmit ends is a predetermined value so that the spectrums of the adjacent spread signals substantially overlap each other.

9. A system as claimed in claim 7, wherein the difference between said carrier frequencies of the respective transmit ends is substantially equal to a frequency corresponding to a reciprocal of a frame period of said PN code, which is equal to a symbol rate of the digital information or an integer multiple thereof.

10. A system as claimed in claim 7, wherein the difference between said carrier frequencies of the respective transmit ends is larger than a frequency corresponding to a reciprocal of a frame period of said PN code, which is equal to a symbol rate of the digital information, wherein the spectrums of the adjacent spread signals substantially overlap each other.

11. A system as claimed in claim 7, wherein said receive end comprises a correlator, matched to said PN code, for calculating a correlation between the received signal and said PN code to recover the digital information transmitted from the desired transmit end.

12. A system as claimed in claim 11, wherein said receive end comprises a band pass filter and a frequency-converter, for demodulating a signal having a center frequency which corresponds to the carrier frequency of the desired transmit end.

13. A spread spectrum communication system comprising:
   a plurality of transmit ends; and
   at least one receive end,
   each of said transmit ends a) spreading digital information by a PN code to provide a spread signal, b) modulating a carrier by said spread signal to provide a modulated signal, and c) then transmitting said modulated signal to said receive end,
   said receive end a) receiving signals transmitted from said transmit ends to provide a received signal, b) frequency-converting the received signal to provide a converted signal, and c) calculating a correlation between the converted signal and said PN code to recover the digital information transmitted from the desired transmit end, said transmit ends are divided into a plurality of groups;

the transmit ends in a group use of carriers having the same frequency and use different PN codes assigned to the respective transmit ends, for spreading the respective digital information;

the transmit ends use the same PN codes for spreading the respective digital information between the groups and use carriers having frequencies between the different groups so that spectrums of at least two of said modulated signals of the different groups overlap each other; and said receive end demodulates a signal having both center frequency and PN code which correspond to both carrier frequency and PN code of the desired transmit end respectively without being affected by other signals.

14. A system as claimed in claim 13, wherein the difference between said carrier frequencies of the respective groups is a predetermined value so that the spectrums of the adjacent spread signals substantially overlap each other.

15. A system as claimed in claim 13, wherein the difference between said carrier frequencies of the respective groups is substantially equal to a frequency corresponding to a reciprocal of a frame period of said PN code, which is equal to a symbol rate of the digital information or an integer multiple thereof.

16. A system as claimed in claim 13, wherein the difference between said carrier frequencies of the respective groups is larger than a frequency corresponding to a reciprocal of a frame period of said PN code, which is equal to a symbol rate of the digital information, wherein the spectrums of the adjacent modulated signals of the different groups substantially overlap each other.

17. A system as claimed in claim 13, wherein said receive end comprises a correlator, matched to said PN code, for calculating a correlation between the converted signal and said PN code to recover the digital information transmitted from the desired transmit end.

18. A system as claimed in claim 17, wherein said receive end comprises a band pass filter and a frequency-converter, for demodulating a signal having a center frequency which corresponds to the carrier frequency of the desired transmit end.

19. A spread spectrum communication system comprising:

a plurality of transmit ends; and at least one receive end, each of said transmit ends a) modulating a carrier by digital information to provide a modulated signal, b) spreading said modulated signal by a PN code to provide a spread signal, and c) then transmitting said spread signal to said receive end, said receive end a) receiving signals transmitted from said transmit ends to provide a received signal, b) frequency-converting the received signal to provide a converted signal, and c) calculating a correlation between the converted signal and said PN code to recover the digital information transmitted from the desired transmit end, wherein said transmit ends are divided into a plurality of groups;

the transmit ends in a group use carriers having the same frequency and use different PN codes assigned to the respective transmit ends, for spreading the respective modulated signals;

the transmit ends use the same PN codes for spreading the respective modulated signals between the groups and use carriers having frequencies between the different groups so that spectrums of at least two of said modulated signals of the different groups overlap each other; and said receive end demodulates a signal having both center frequency and PN code which correspond to both carrier frequency and PN code of the desired transmit end respectively without being affected by other signals.

20. A system as claimed in claim 19, wherein the difference between said carrier frequencies of the respective groups is a predetermined value so that the spectrums of the adjacent spread signals substantially overlap each other.

21. A system as claimed in claim 19, wherein the difference between said carrier frequencies of the respective groups is substantially equal to a frequency corresponding to a reciprocal of a frame period of said PN code, which is equal to a symbol rate of the digital information or an integer multiple thereof.

22. A system as claimed in claim 19, wherein the difference between said carrier frequencies of the respective groups is larger than a frequency corresponding to a reciprocal of a frame period of said PN code, which is equal to a symbol rate of the digital information, wherein the spectrums of the adjacent spread signals of the different groups substantially overlap each other.

23. A system as claimed in claim 19, wherein said receive end comprises a correlator, matched to said PN code, for calculating a correlation between the converted signal and said PN code to recover the digital information transmitted from the desired transmit end.

24. A system as claimed in claim 23, wherein said receive end comprises a band pass filter and a frequency-converter, for demodulating a signal having a center frequency which corresponds to the carrier frequency of the desired transmit end.

* * * * *